US012606429B2

(12) United States Patent
Erickson et al.

(10) Patent No.: US 12,606,429 B2
(45) Date of Patent: Apr. 21, 2026

(54) MOLDED ONE-PIECE FUNNEL WITH SUPPORT COLLAR

(71) Applicant: TWD Scientific, LLC, Pleasant Prairie, WI (US)

(72) Inventors: Scott A. Erickson, Zion, IL (US); Jinghua H. Schneider, Wadsworth, IL (US)

(73) Assignee: TWD Scientific, LLC, Pleasant Prairie, WI (US)

( * ) Notice: Subject to any disclaimer, the term of this patent is extended or adjusted under 35 U.S.C. 154(b) by 0 days.

(21) Appl. No.: 18/886,728

(22) Filed: Sep. 16, 2024

(65) Prior Publication Data

US 2025/0109005 A1 Apr. 3, 2025

Related U.S. Application Data

(60) Provisional application No. 63/587,184, filed on Oct. 2, 2023.

(51) Int. Cl.
*B67C 11/02* (2006.01)

(52) U.S. Cl.
CPC .................................... *B67C 11/02* (2013.01)

(58) Field of Classification Search
CPC ....................................................... B67C 11/02
See application file for complete search history.

(56) References Cited

U.S. PATENT DOCUMENTS

| | | | | |
|---|---|---|---|---|
| 100,851 A * | 3/1870 | Brundage | B67C 11/02 | 141/340 |
| 299,513 A * | 6/1884 | Bolton | B67C 11/02 | 141/340 |
| 6,179,022 B1 * | 1/2001 | Schneider | B67C 11/02 | 141/331 |
| 6,425,424 B1 * | 7/2002 | Ellis Calvo | B67C 11/02 | 141/331 |
| 2011/0308667 A1 * | 12/2011 | Gallegos | B67C 11/02 | 141/340 |

FOREIGN PATENT DOCUMENTS

| | | | |
|---|---|---|---|
| KR | 200324502 Y1 * | 8/2003 | B67C 11/00 |

* cited by examiner

*Primary Examiner* — Jason K Niesz
(74) *Attorney, Agent, or Firm* — Andrus Intellectual Property Law, LLP

(57) ABSTRACT

A one-piece molded funnel for transferring granular material or liquids into a container. The molded funnel includes a main body having an open interior to receive the material or liquid. A pouring neck extends from the main body and has a first diameter that is smaller than the open interior. A support collar is formed as part of the funnel and is designed to support the funnel on the storage container. The support collar has a second diameter that is larger than the first diameter of the pouring neck to create a receiving channel between the pouring neck and the support collar. During use of the funnel, the upper end of the storage container is received in the receiving channel and the pouring neck extends into the upper end of the storage container. The support collar can include different diameter portions or expansion gaps to accommodate different sized storage containers.

18 Claims, 8 Drawing Sheets

MOLDED ONE-PIECE FUNNEL WITH SUPPORT COLLAR

CROSS REFERENCE TO RELATED APPLICATION

The present application is based on and claim priority to U.S. Provisional Patent Application Ser. No. 63/587,184, filed on Oct. 2, 2023, the disclosure of which is incorporated herein by reference.

BACKGROUND

The present disclosure relates to a molded one-piece funnel that has a large diameter main body segment and a reduce diameter pouring neck. More specifically, the present disclosure relates to a one-piece funnel that includes a support collar that surrounds the pouring neck to support the funnel during use.

U.S. Pat. No. 6,179,022 discloses a one-piece weighing funnel that is used to weigh a granular material that is received in an open interior of the weighing funnel. After the material has been weighed, the material can be poured right from the funnel into another container or bottle for use. The weighing funnel includes a reduced diameter pouring neck that is designed to be received in the open end of a neck portion of the storage container. Although such a weighing funnel functions well to weigh the material and pour the material into another container, the use must be very careful when aligning the pouring neck with the open end of the container or bottle. In embodiments in which the outer diameter of the pouring neck is much smaller than the diameter of the container, the weighing funnel can become easily dislodged, which may result in spilling of the material. Therefore, the inventors have recognized a need for a weighing or pouring funnel that includes an improved support mechanism for holding the funnel in place on the storage container receiving the material.

SUMMARY

The present disclosure relates to a one-piece molded funnel that can be used to pour a liquid or flowable material into a receiving container. The molded funnel includes a support collar that surrounds a pouring neck to help support the funnel on the receiving container as material or liquid is being transferred into the receiving container.

In a first embodiment of the present disclosure, a one-piece molded funnel is provided that includes a main body that defines an open interior sized to receive material or a liquid. The main body is defined by an outer wall. The funnel further includes a pouring neck that is joined to the main body and extends from the main body. The pouring neck has a first diameter that is smaller than the size of the open interior of the main body. The pouring neck is designed to direct the flow of the material or liquid out of the main body and into the storage container.

The funnel further includes a support collar that is joined to the outer wall of the main body. The support collar is designed to help support the funnel on the storage container in a use position. The support collar includes a support wall that is joined to the main body of the funnel and has a second diameter. The support collar is located such that the support collar extends along at least a portion of the length of the pouring neck. The support collar is designed having a second diameter that is greater than the first diameter of the pouring neck to create a receiving channel between the support collar and the pouring neck. The receiving collar is designed to receive a portion of the storage container such that the funnel can be received on and supported by the storage container.

In one exemplary embodiment, the pouring neck extends away from the main body to a discharge end. The discharge end of the pouring neck extends past an outer end of the support collar in a first embodiment. In a second, contemplated embodiment, the discharge end of the pouring neck is aligned with the outer end of the support collar.

In another contemplated embodiment of the present disclosure, a one-piece molded funnel is provided that includes a main body that defines an open interior sized to receive material or a liquid to be weighed. The main body is defined by an outer wall. The funnel further includes a conical portion that extends from the main body and has a decreasing diameter from an outer edge to an inner edge. The funnel further includes a pouring neck that is joined to the inner edge of the conical portion and extends from the conical portion of the main body. The pouring neck has a first diameter that is smaller than the size of the open interior of the main body. The pouring neck is designed to direct the flow of the material or liquid out of the main body and into the storage container.

The funnel further includes a support collar that is joined to the conical portion of the main body. The support collar is designed to help support the funnel on the storage container in a use position. The support collar includes a support wall that is joined to the conical portion and has a second diameter. The support collar is located such that the support collar extends along at least a portion of the length of the pouring neck. The support collar is designed having a second diameter that is greater than the first diameter of the pouring neck to create a receiving channel between the support collar and the pouring neck. The receiving collar is designed to receive a portion of the storage container such that the funnel can be received on and supported by the storage container.

In another contemplated embodiment of the present disclosure, a one-piece molded funnel is provided that includes a main body that defines an open interior sized to receive material or a liquid. The main body is defined by an outer wall that decreases in diameter from an outer edge to an inner edge. The funnel further includes a pouring neck that is joined to the inner edge of the main body and extends from the inner edge of the main body. The pouring neck has a first diameter that is smaller than the size of the open interior of the main body. The pouring neck is designed to direct the flow of the material or liquid out of the main body and into the storage container.

The funnel further includes a support collar that is joined to the outer wall of the main body between the outer edge and the inner edge of the main body. The support collar is designed to help support the funnel on the storage container in a use position. The support collar includes a support wall that is joined to the outer wall of the main body and has a second diameter. The support collar is located such that the support collar extends along at least a portion of the length of the pouring neck. The support collar is designed having a second diameter that is greater than the first diameter of the pouring neck to create a receiving channel between the support collar and the pouring neck. The receiving collar is designed to receive a portion of the storage container such that the funnel can be received on and supported by the storage container Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
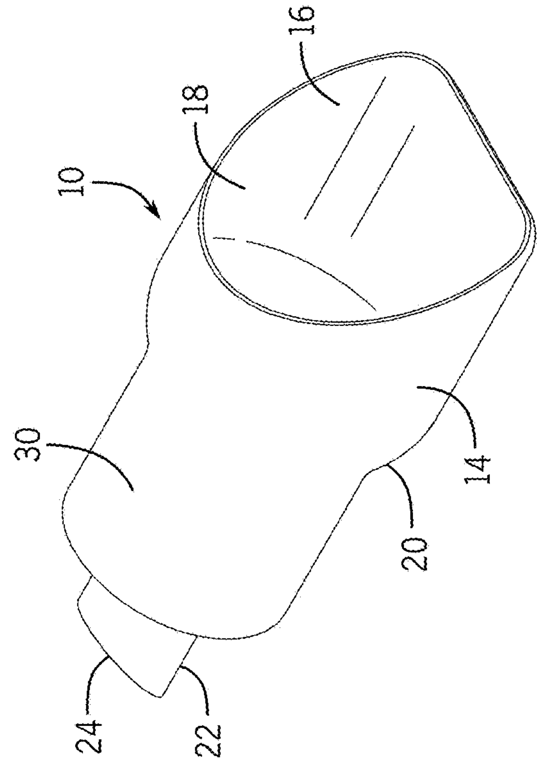
FIG. 1 is a perspective view of a one-piece weighing funnel constructed in accordance with a first embodiment of the present disclosure.
Figure 3:
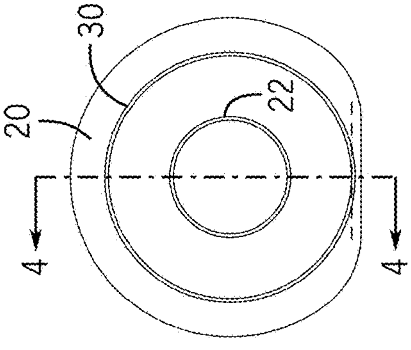
FIG. 3 is an end plan view of the one-piece funnel.

FIG. 1 illustrates a molded one-piece funnel constructed in accordance with a first embodiment of the present disclosure. The molded one-piece funnel shown in the first embodiment of FIG. 1 is a weighing funnel 10 that has a main body 14 having an open end 16 that provides access to an open interior 18 sized to receive and hold a material being weighed. Typically, weighing funnel 10 is designed to receive and hold granular material for accurate weighing prior to pouring the material into another receiving container. The main body 14 merges into a conical segment 20 that tapers down to a reduced diameter pouring neck 22. The pouring neck 22 can best be seen in the section view of FIG. 4. The pouring neck 22 terminates at a discharge end 24. In the embodiment shown, the discharge end 24 has a sloping outer edge surface 25 that extends further from the conical segment 20 and main body 14 at the lower edge as compared to the upper edge. However, it is contemplated that the outer edge surface 25 could be replaced with a straight edge surface while operation within the scope of the present disclosure and the disclosed first embodiment. The pouring neck 22 in the embodiment illustrated has an outer diameter that is shown by reference character A in FIG. 4. The outer diameter A is selected to be less than the inner diameter of a receiving container that will receive material received and retained in the open interior 18.

Figure 4:
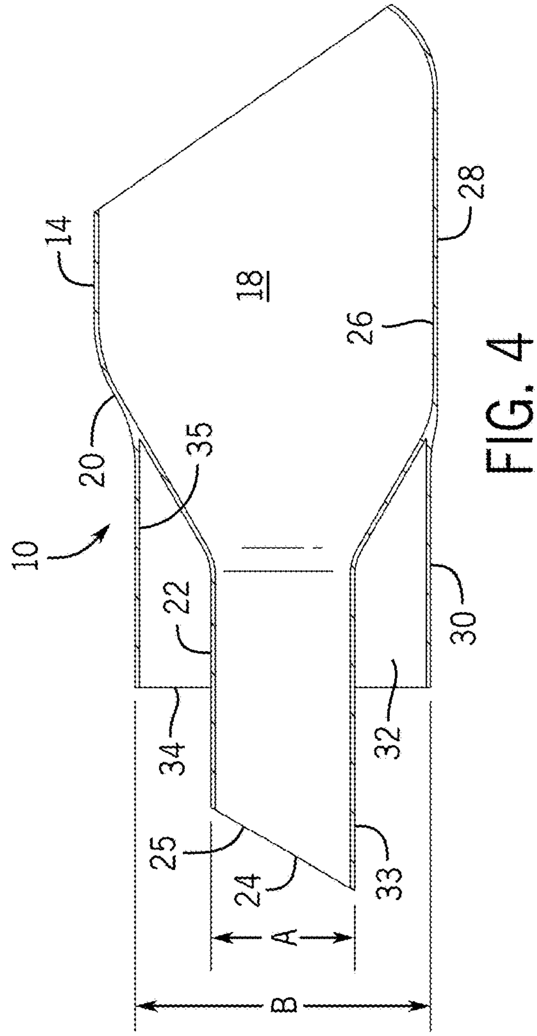
FIG. 4 is a side section view taken along line 4-4 of FIG. 3.

As can be understood in the section view of FIG. 4, the molded weighing funnel 10 is formed as a unitary molded member defined by an outer wall 26. The outer wall 26 defines a flat surface 28 at the bottom side of the weighing funnel 10 that allows the weighing funnel 10 to assume the stable resting position shown in FIG. 4. In this position, material can be loaded into the open interior 18 and the entire weighing funnel 10 moved onto a scale for weighing. Once the material has been weighed in the weighing funnel 10, the material can be transferred to another container as is well known. Further details of the use and function of the weighing funnel 10 are shown and described in U.S. Pat. No. 6,179,022, the disclosure of which is incorporated herein by reference.

In accordance with the present disclosure, the weighing funnel 10 is designed to further include a support collar 30 that surrounds at least a portion of the pouring neck 22. The support collar 30 is joined to and extends from the outer wall 26 at a location spaced along the conical segment 20. In the embodiment shown, the support collar 30 is joined to the outer wall 26 at a location that is spaced slightly from the transition between the conical segment 20 and the pouring neck 22. The support collar 30 has a constant inner diameter B that is greater than the outer diameter A of the pouring neck 22. The difference in the diameters A and B define an annular receiving channel 32 between the outer surface 33 of the pouring neck 22 and the inner surface 35 of the support collar 30. The open area defined by the receiving channel 32 is designed to receive the top end 38 of a receiving container 36, as shown in FIG. 5.

Figure 2:
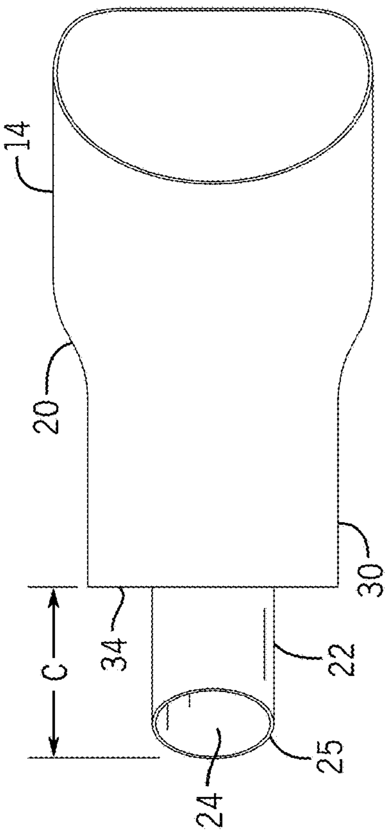
FIG. 2 is a top plan view of the one-piece funnel.

As can be best seen in FIGS. 2 and 4, in the exemplary embodiment shown, the discharge end 24 of the pouring neck 22 extend past the outer end 34 of the support collar 30 by a distance C. The distance C can vary between different funnel configurations and can be based on the desired use of the weighing funnel 10. In the embodiment shown, the discharge end 24 of the pouring neck 22 extends past the outer end 34 of the support collar 30 by the distance C, which is selected such that the discharge end 24 can extend into the container 36 past the outer end 34. However, it is contemplated that the discharge end 24 may not extend past the outer end 34 in other embodiments, or may extend a greater distance.

Figure 5:
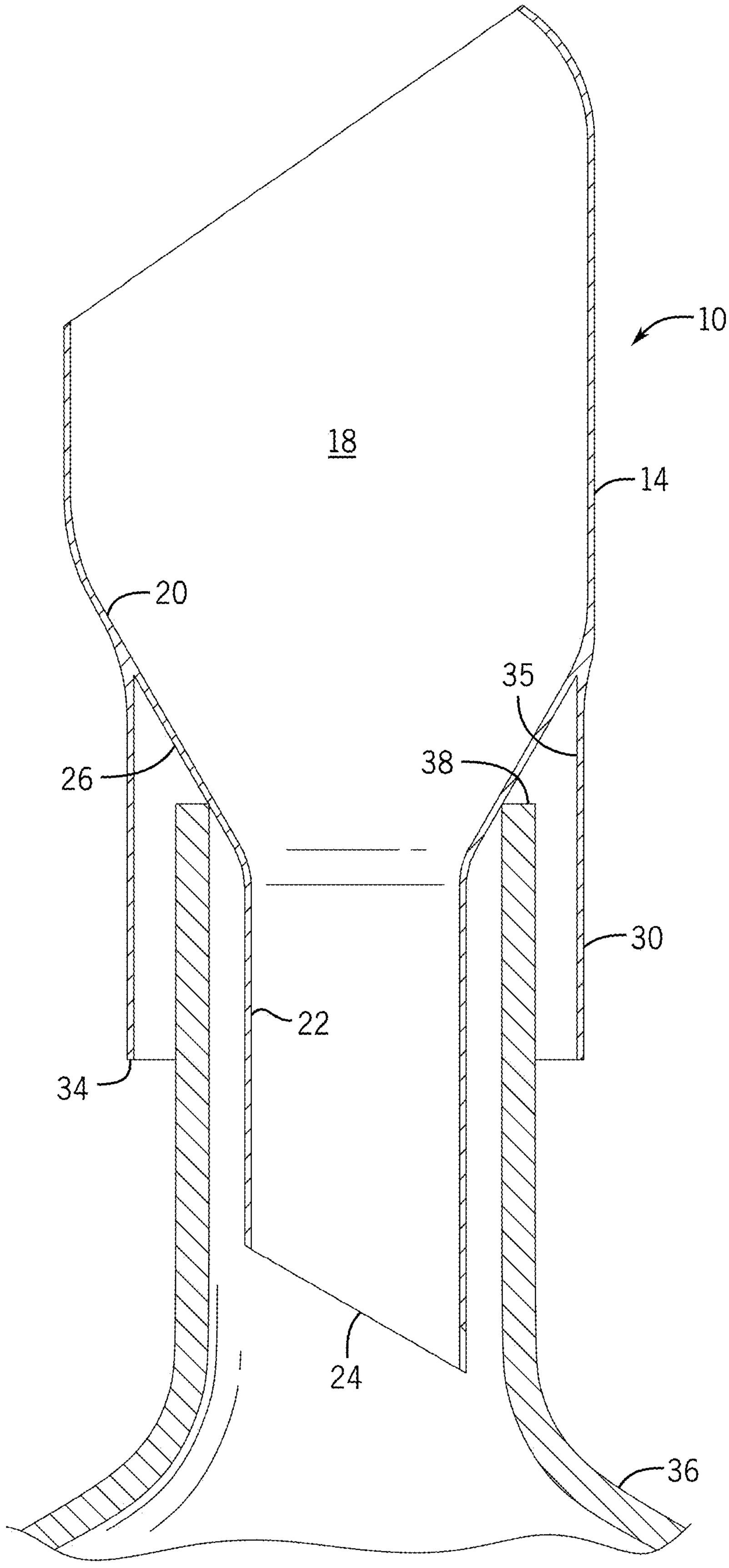
FIG. 5 is a view of the one-piece weighing funnel being used with a receiving container.

In the in-use position, as shown in FIG. 5, the top end 38 of the receiving container 36 contacts the outer wall 26 in the conical segment 20 and is entrapped between the outer wall 26 of the main body 14 and the inner surface 35 of the support collar 30. When funnel 10 is in this position, the support collar 30 helps to prevent tipping of the funnel 10 relative to the receiving container 36 to aid in pouring the granular material into the receiving container 36.

Figure 6:
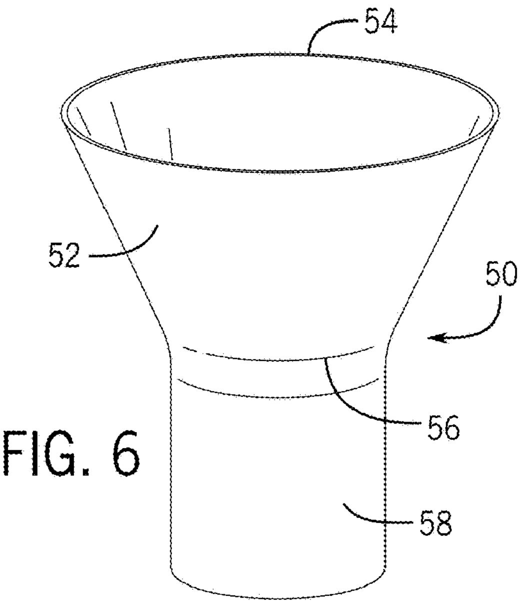
FIG. 6 is a perspective view of a one-piece pouring funnel constructed in accordance with a second embodiment of the present disclosure.
Figure 7:
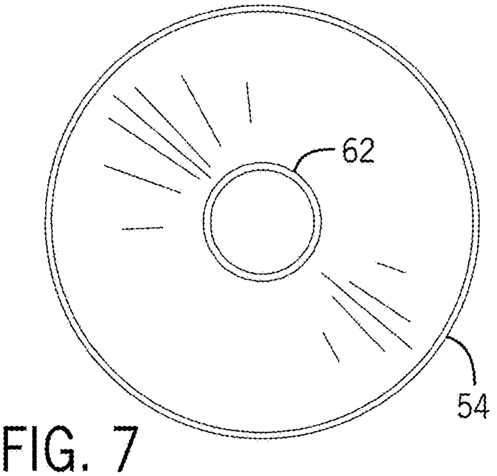
FIG. 7 is a top plan view of the one-piece pouring funnel.
Figure 8:
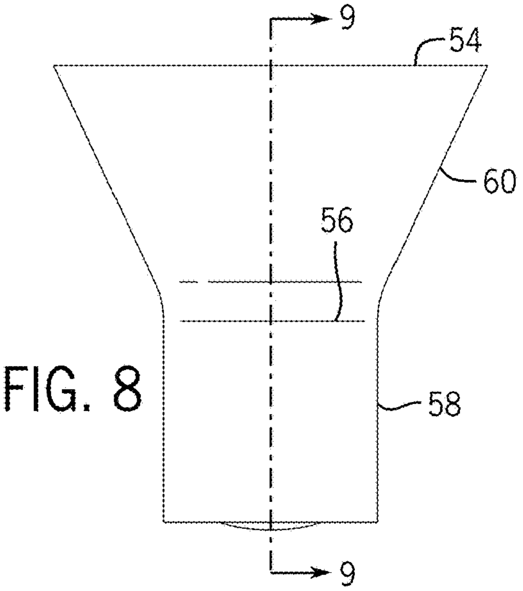
FIG. 8 is side elevation view of the one-piece pouring funnel.

FIG. 6 illustrates a second type of molded one-piece funnel. In the embodiment shown, the funnel is a pouring funnel 50 that is constructed in accordance with a second embodiment of the present disclosure. The pouring funnel 50 is a one-piece molded component that is designed to allow granular materials or liquids to be poured from a storage container into another receiving container. Unlike the first embodiment shown in FIGS. 1-5, the pouring funnel 50 is not designed to hold granular material for weighing and is instead designed to act as a transfer mechanism for transferring liquids or other granular materials from one container to another. The pouring funnel 50 is designed to be stable when supported on a storage container such that material or liquid can be more easily transferred from one container to another.

The pouring funnel 50 shown in FIG. 6 includes a conical, upper receiving portion 52 that has an upper outer edge 54. The outer surface of the receiving portion 52 decreases in diameter from the upper outer edge 54 to the transition edge 56. The transition edge 56 defines a connection between the outer surface of the receiving portion and a support collar 58, which functions in a similar manner as the support collar 30 shown in the embodiment of FIGS. 1-4.

Figure 9:
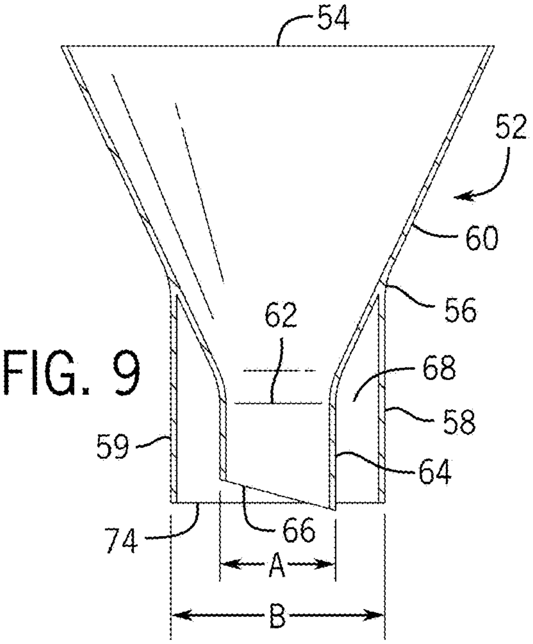
FIG. 9 is a section view taken along line 9-9 of FIG. 8.
Figure 10:
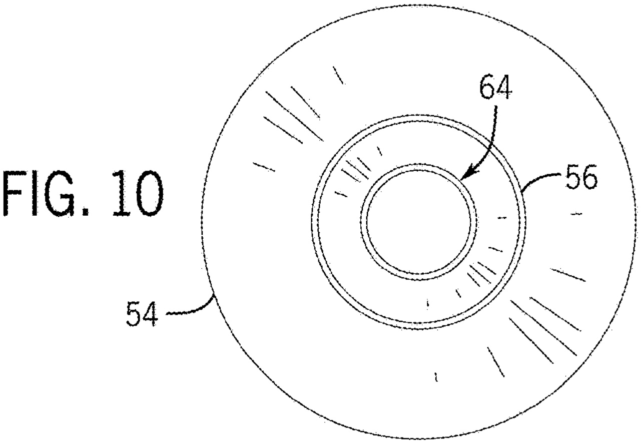
FIG. 10 is a bottom plan view of the pouring funnel.

Referring now to the section view shown in FIG. 9, the support collar 58 includes a constant diameter wall 59 that is joined to the conical outer wall 60 that defines the receiving portion 52 of the pouring funnel 50. The outer wall 60 that defines the receiving portion 52 extends past the transition edge 56 to a lower transition area that creates a lower edge 62. As can be understood in FIG. 9, the diameter of the receiving portion 52 decreases from the maximum diameter at the upper edge 54 to the smallest diameter at the lower edge 62. In this manner, the receiving portion 52 directs the material downward and inward toward the lower edge 62.

The lower edge 62 transitions into a pouring neck 64 that has a constant outer diameter and extends from the lower edge 62 to a discharge end 66. The diameter of the discharge end 66 defined by the outer wall of the pouring neck 64 is less than the inner diameter of the support collar 58. As in the first embodiment, the pouring neck 64 has an outer diameter A that is less than the inner diameter B of the support collar 58. The difference between these two diameters A and B creates a receiving channel 68 which is sized to receive the neck of a receiving container.

Figure 11:
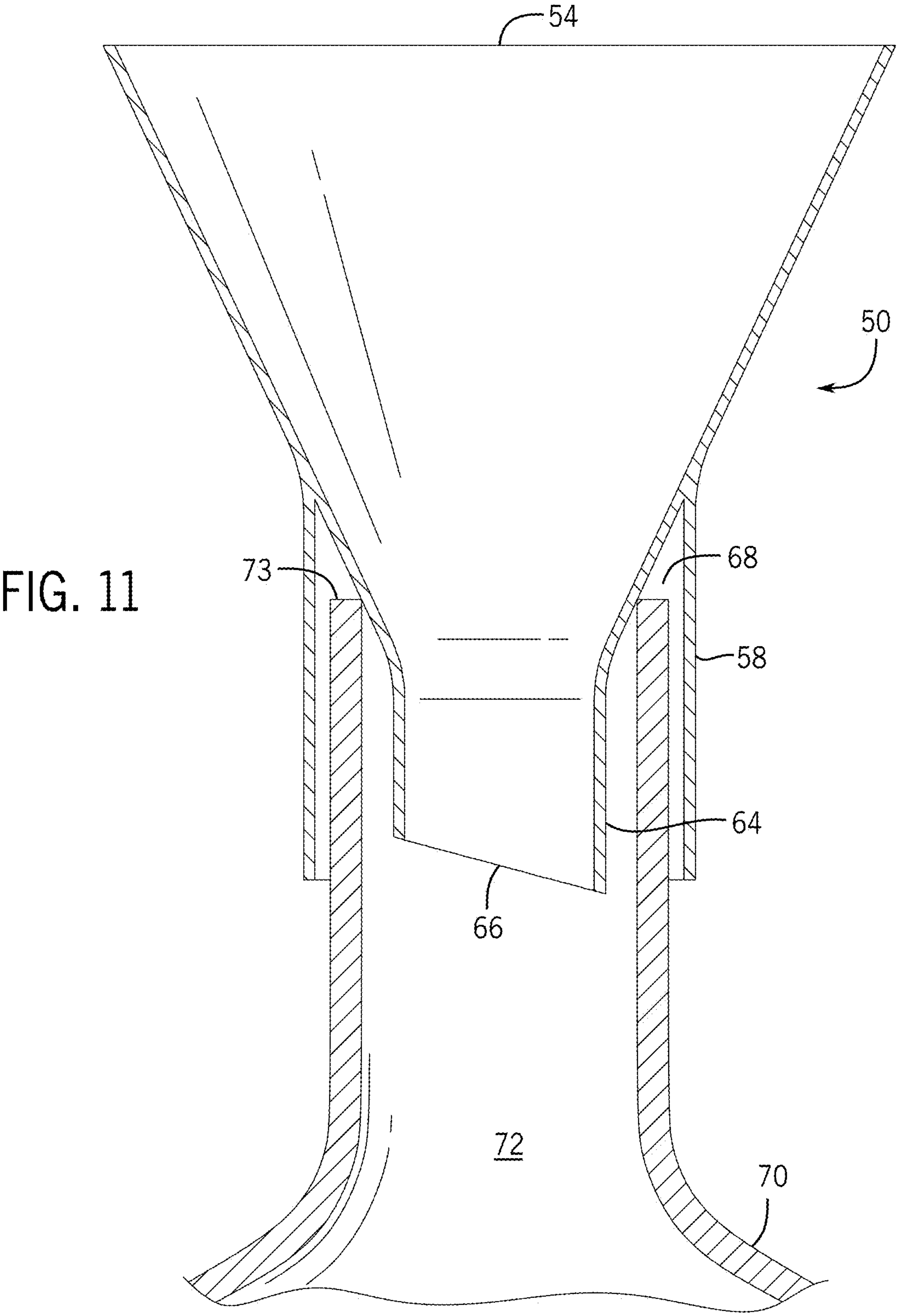
FIG. 11 is a view of the one-piece pouring funnel being used with a receiving container.

Referring now to FIG. 11, the pouring funnel 50 is shown as installed on the upper neck 71 of a receiving container 70. As in the embodiment shown in FIG. 5, contact between the top end 73 of the receiving container 70 supports the pouring funnel 50 such that the pouring funnel 50 support to allow material to be poured into the open upper end defined by the upper edge 54 such that the material or liquid is directed into the interior 72 of the receiving container 70.

In the embodiment shown in FIGS. 9 and 11, the discharge end 66 of the pouring neck 64 is aligned with the lower edge 74 of the support collar 58. However, the pouring funnel 50 of the second embodiment could be constructed such that the discharge end 66 of the pouring neck 64 would extend past the lower edge 74 of the support collar 58 in a similar manner as shown in weighing funnel 10 shown in FIG. 4. Both the weighing funnel 10 and the pouring funnel 50 can be constructed having similar support collars to support the funnels on a receiving container.

Figure 12:
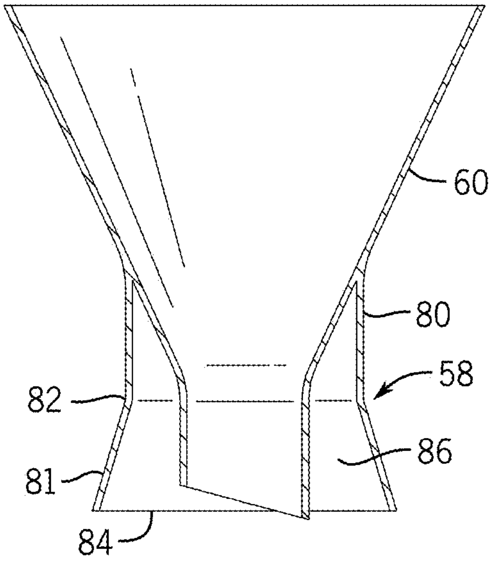
FIG. 12 is a section view of a third embodiment of the one-piece pouring funnel of the present disclosure.

FIG. 12 is an alternate configuration of the funnel shown in FIGS. 6-10. In the embodiment shown in FIG. 12, the support collar 58 includes a first wall portion 80 that defines a constant inner diameter and extends from the outer wall 60 to a transition point 82. Below the transition point 82, the support collar 58 has a second wall portion 81 that has an outer wall that increases in diameter from the transition point 82 to the lower edge 84. Thus, the inner diameter of the receiving channel 86 increases from the transition point 82 to the lower edge 84. In this manner, the support collar 58 of the embodiment shown in FIG. 12 can accommodate multiple outer opening dimensions of the receiving container 70.

Figure 13:
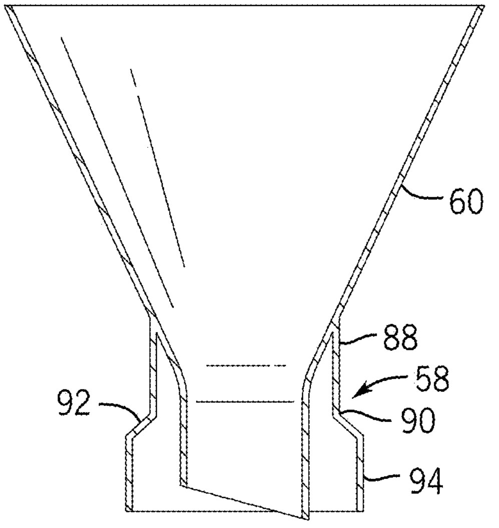
FIG. 13 is a section view of a fourth embodiment of the one-piece pouring funnel of the present disclosure.

FIG. 13 is yet another alternate configuration of the funnel shown in FIGS. 6-10. In the embodiment shown in FIG. 13, the support collar 58 includes a first, upper wall portion 88 that has a first inner diameter. The first, upper wall portion 88 extends to transition point 90 where it is joined to a sloping shoulder portion 92. The sloping shoulder portion 92 extends from the transition point 90 to a second, lower wall portion 94. The second, lower wall portion 94 defines a second inner diameter that is larger than the first inner diameter. The first and second inner diameters are each constant and the sloping shoulder portion 92 creates the transition between the different inner diameters. In this way, the support collar 58 of the embodiment shown in FIG. 13 has a staged inner diameter that can accommodate two different outer opening dimensions for the receiving container 70.

Figure 14:
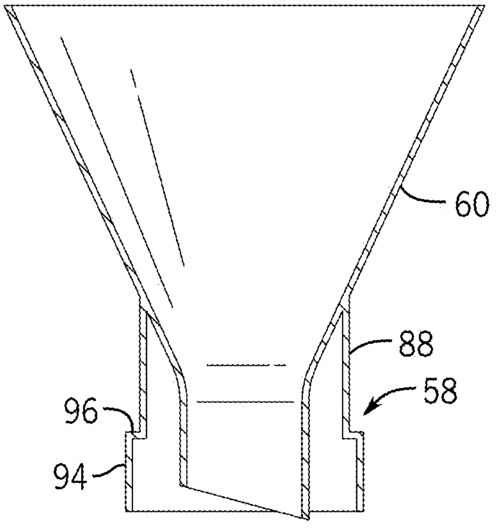
FIG. 14 is a section view of a fifth embodiment of the one-piece pouring funnel of the present disclosure.

FIG. 14 is another alternate configuration that is similar to the configuration shown in FIG. 13. Unlike FIG. 13, the embodiment of FIG. 14 has a horizontal transition wall 96 that extends between the upper wall portion 88 and the lower wall portion 94. The horizontal transition wall 96 creates the transition between the two different inner diameters and allows the support collar 58 to accommodate two different outer opening dimensions for the receiving container 70.

Figure 15:
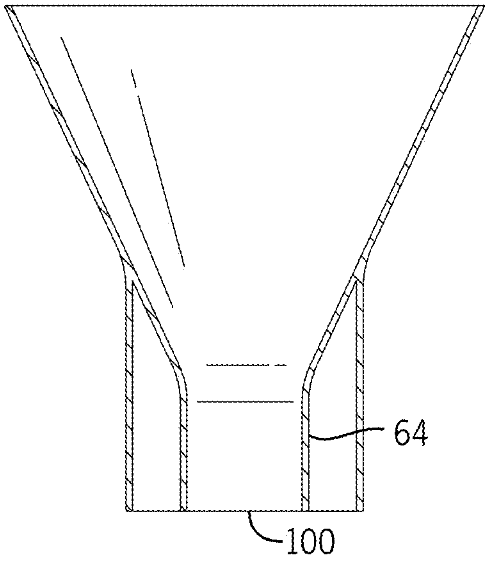
FIG. 15 is a section view of a sixth embodiment of the one-piece pouring funnel of the present disclosure.

FIG. 15 is another alternate configuration and includes a pouring neck 64 that has a spout tip 100 that is not angle cut. Other than the configuration of the pouring neck 64, the pouring funnel shown in FIG. 15 is similar to the embodiment shown and described in FIGS. 6-10.

Figure 16:
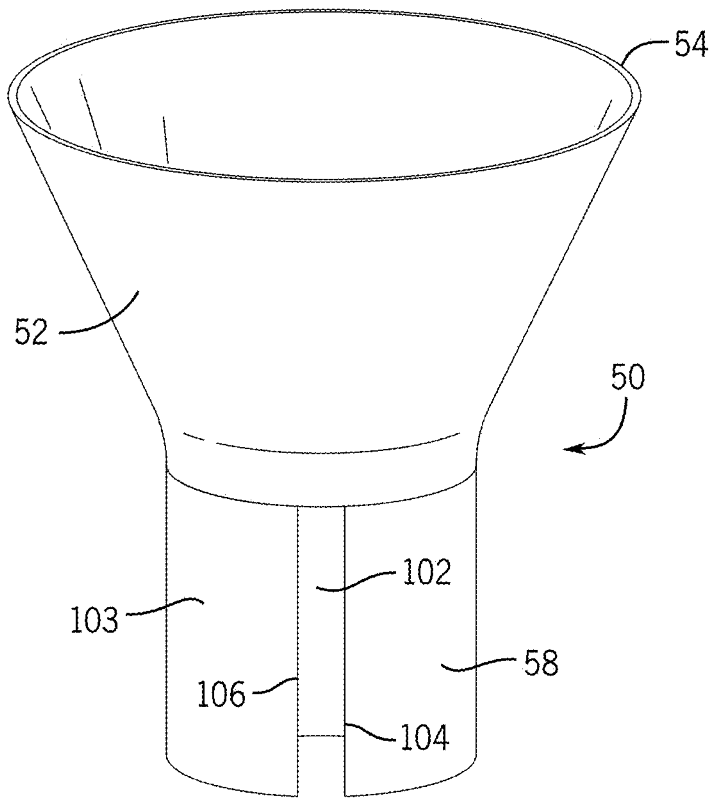
FIG. 16 is a side view of another alternate embodiment of the one-piece pouring funnel of the present disclosure.

FIG. 16 is yet another alternate configuration for the funnel design that could be incorporated in either the weighing funnel 10 or the pouring funnel 50. In this embodiment, the support collar 58 includes a support wall 103 that does not extend a full 360° as in the prior embodiment. Instead, the support wall 103 includes an expansion gap 102 between opposite edges 104 and 106 of the support wall. The expansion gap 102 allows the solid portions of the support collar 58 to flex outward to accommodate different dimensions of the neck of the receiving container. Although only one expansion gap 102 is shown, the support collar 58 could include more than one expansion gap 102 spaced around the circumference of the support collar 58. The expansion gap or gaps 102 in the support wall 103 of the support collar 58 allow the support collar 58 to flex outward to provide stability for the pouring funnel on a variety of storage containers.

Although the alternate configurations of FIGS. 12-16 are shown with the pouring funnel design of FIGS. 6-10, it should be understood that the alternate designs of the support collar of FIGS. 12-16 could also be used with the weighing funnel 10 design of FIGS. 1-4. Both the weighing funnel 10 and pouring funnel 50 include many of the same design components and each include the same support collar design, which can be varied depending on the desired use of the weighing funnel and the pouring funnel.

Figure 17:
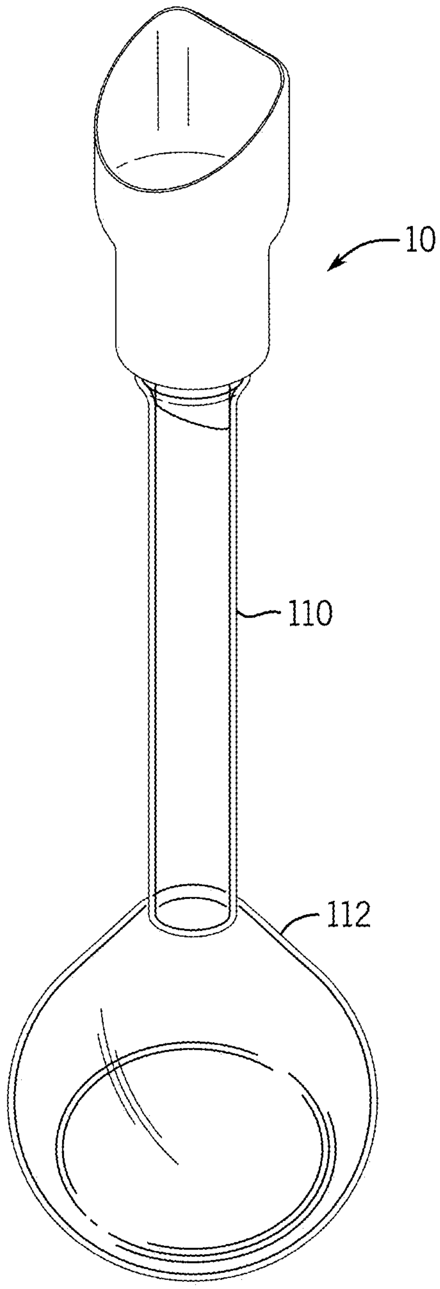
FIG. 17 is perspective view of the weighing funnel supported on the neck of a receiving container.

FIG. 17 is a view of the weighing funnel 10 supported on an extended neck portion 110 of a receiving container 112. The receiving container 112 is shown as a glass container that is used to mix the material from the weighing funnel 10 with a liquid that is contained in the glass container. In the use position shown, the weighting funnel 10 is supported on the neck portion 110 to aid in the transition of the material from the weighing funnel 10 to the receiving container 112.

Figure 18:
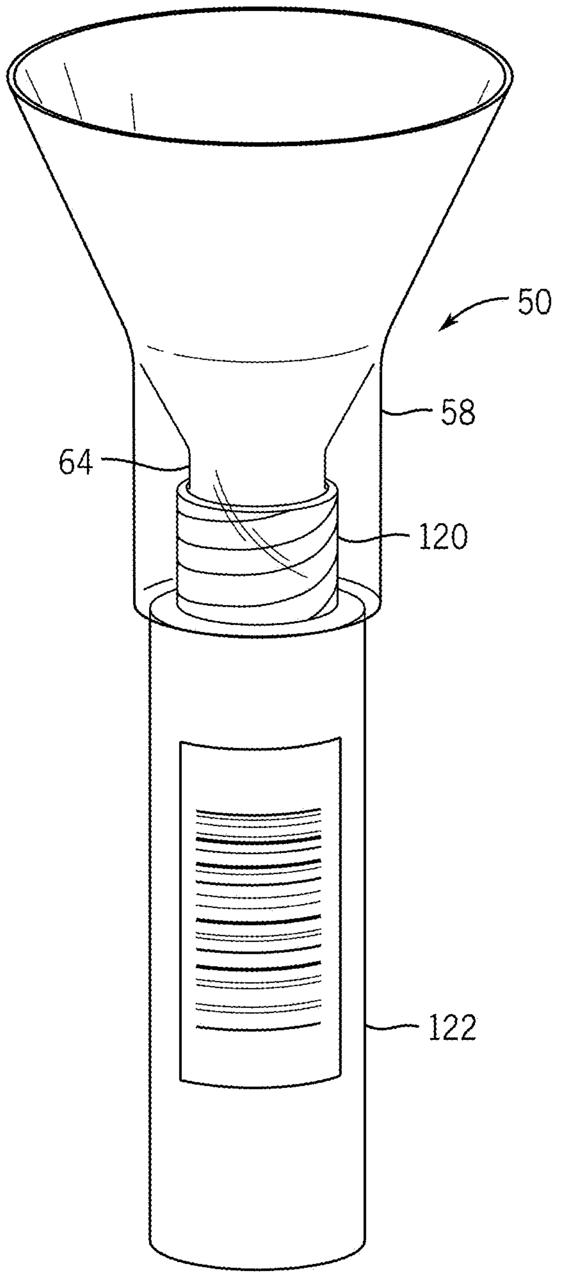
FIG. 18 is a perspective view of a pouring funnel supported on the neck of a receiving container.

FIG. 18 is a view of the pouring funnel 50 supported on a threaded neck portion 120 of a receiving container 122. In this view, the support collar is shown transparently to illustrate the support of the pouring funnel 50 on the receiving container. In this use position, the pouring neck 64 extends into the neck portion 120 to direct the liquid or granular material into the open interior of the receiving container 122.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A one-piece molded funnel comprising:
- a main body having an open interior defined by an outer wall and configured to receive material;
- a pouring neck extending from the main body, the pouring neck having a first diameter; and
- a support collar having a support wall extending from and joined to the outer wall of the main body, the support collar having a second diameter and including at least one expansion gap formed in the support wall,
- wherein the support collar extends along at least a portion of a length of the pouring neck and is spaced from the pouring neck to define a receiving channel between the support collar and the pouring neck,
- wherein the expansion gap allows the support collar to flex outward to increase the second diameter of the support collar.

2. The funnel of claim 1 wherein the second diameter of the support collar is constant from outer wall of the main body to an outer end of the support collar.

3. The funnel of claim 1 wherein the support collar has a first wall portion having a first collar diameter and a second wall portion having a second collar diameter, wherein the second collar diameter is greater than the first collar diameter.

4. The funnel of claim 1 wherein the support collar has a first wall portion having a first collar diameter and a second wall portion, wherein the diameter of the second wall portion increases from a transition point between the first wall portion and the second wall portion.

5. The funnel of claim 1 wherein the pouring neck includes a discharge end and the support collar includes an outer end, wherein the discharge end of the pouring neck extends at least to the outer end of the support collar.

6. The funnel of claim 5 wherein the discharge end of the pouring neck extends past the outer end of the support collar.

7. The funnel of claim 1 wherein the main body includes a receiving portion sized to receive the material and a conical segment that transitions between the receiving portion and the pouring neck.

8. The funnel of claim 7 wherein the support collar is connected to the conical segment of the main body and the expansion gap extends along the entire length of the support collar.

9. The funnel of claim 1 wherein the main body has a constantly decreasing diameter from an upper edge to a lower edge, wherein the pouring neck extends from the lower edge.

10. The funnel of claim 9 wherein the support collar is connected to the main body between the upper edge and the lower edge.

11. A one-piece molded funnel comprising:
- a main body having an open interior defined by an outer wall and having an open interior configured to receive material to be weighed;
- a conical portion extending from the main body and having a decreasing diameter;
- a pouring neck extending from the conical portion, the pouring neck having a first diameter; and
- a support collar having a support wall extending from and joined to the conical portion, the support collar having a second diameter and including at least one expansion gap formed in the support wall,
- wherein the support collar extends along at least a portion of a length of the pouring neck and is spaced from the pouring neck to define a receiving channel between the support collar and the pouring neck,
- wherein the expansion gap allows the support collar to flex outward to increase the second diameter of the support collar.

12. The funnel of claim 11 wherein the support collar extends from a transition edge joined to the outer wall of the main body to an outer end and the second diameter of the support collar is constant from transition edge to the outer end of the support collar, wherein the expansion gap extends from the outer end to the transition edge.

13. The funnel of claim 11 wherein the pouring neck includes a discharge end and the support collar includes an outer end, wherein the discharge end of the pouring neck extends at least to the outer end of the support collar.

14. The funnel of claim 13 wherein the discharge end of the pouring neck extends past the outer end of the support collar.

15. A one-piece molded funnel comprising:
- a main body having an open interior defined by an outer wall and configured to receive material, the outer wall having a decreasing diameter from an outer edge to an inner edge;
- a pouring neck extending from the inner edge, the pouring neck having a first diameter; and
- a support collar having a support wall extending from and joined to the outer wall of the main body between the outer edge and the inner edge, the support collar having a second diameter and including at least one expansion gap that is a removed portion of the support wall that extends from an outer end of the support collar,
- wherein the support collar extends along at least a portion of a length of the pouring neck and is spaced from the pouring neck to define a receiving channel between the support collar and the pouring neck,
- wherein the expansion gap allows the support collar to flex outward to increase the second diameter of the support collar.

16. The funnel of claim 15 wherein the second diameter of the support collar is constant from outer wall of the main body to an outer end of the support collar.

17. The funnel of claim 15 wherein the pouring neck includes a discharge end and the support collar includes an outer end, wherein the discharge end of the pouring neck extends at least to the outer end of the support collar.

18. The funnel of claim 17 wherein the discharge end of the pouring neck extends past the outer end of the support collar.

* * * * *